United States Patent
Dupont et al.

(10) Patent No.: US 11,044,495 B1
(45) Date of Patent: Jun. 22, 2021

(54) SYSTEMS AND METHODS FOR VARIABLE LENGTH CODEWORD BASED DATA ENCODING AND DECODING USING DYNAMIC MEMORY ALLOCATION

(71) Applicant: Cyborg Inc., New York, NY (US)

(72) Inventors: Nicolas Thomas Mathieu Dupont, New York, NY (US); Alexandre Helle, New York, NY (US)

(73) Assignee: Cyborg Inc., New York, NY (US)

( * ) Notice: Subject to any disclaimer, the term of this patent is extended or adjusted under 35 U.S.C. 154(b) by 0 days.

(21) Appl. No.: 16/274,417

(22) Filed: Feb. 13, 2019

Related U.S. Application Data

(60) Provisional application No. 62/630,068, filed on Feb. 13, 2018.

(51) Int. Cl.
| | |
|---|---|
| *H04N 19/91* | (2014.01) |
| *H04N 19/13* | (2014.01) |
| *H04N 19/48* | (2014.01) |
| *H04N 19/50* | (2014.01) |
| *H04L 29/06* | (2006.01) |

(52) U.S. Cl.
CPC ............ *H04N 19/91* (2014.11); *H04L 69/04* (2013.01); *H04N 19/13* (2014.11); *H04N 19/48* (2014.11); *H04N 19/50* (2014.11)

(58) Field of Classification Search
CPC ........ H04N 19/91; H04N 19/13; H04N 19/48; H04N 19/50; H04L 69/04
USPC .................................................... 375/240.23
See application file for complete search history.

(56) References Cited

U.S. PATENT DOCUMENTS

| | | | |
|---|---|---|---|
| 3,701,108 A | 10/1972 | Loh et al. | |
| 4,748,638 A * | 5/1988 | Friedman | H03M 7/42 341/50 |
| 5,016,009 A | 5/1991 | Whiting et al. | |
| 5,883,588 A | 3/1999 | Okamura | |
| 6,298,087 B1 | 10/2001 | Luna et al. | |
| 6,304,676 B1 * | 10/2001 | Mathews | G06T 9/005 382/244 |
| 6,714,145 B1 * | 3/2004 | Marques | H03M 7/30 341/50 |
| 9,338,456 B2 | 5/2016 | Karczewicz et al. | |
| 9,516,316 B2 | 12/2016 | Karczewicz et al. | |
| 9,584,155 B1 | 2/2017 | Gopal et al. | |
| 9,729,169 B2 | 8/2017 | Kalevo et al. | |

(Continued)

OTHER PUBLICATIONS

Office Action for U.S. Appl. No. 16/691,496, dated Aug. 19, 2020, 15 pages.

(Continued)

*Primary Examiner* — Zaihan Jiang
(74) *Attorney, Agent, or Firm* — Cooley LLP

(57) ABSTRACT

A data compression system includes an encoder for receiving a binary string of data which is partitioned into one or more binary segments and assigned Variable Length Codewords (VLCs) to be stored to a file or transmitted over a medium, such as a wired network or a wireless network. The system can also include a decoder for receiving the VLCs from a file or network and reproducing a binary string of data substantially identical to that which was input to the encoder. The system can also include a processor, a memory and/or a coder/decoder (CODEC) for compressing/decompressing a raw or compressed data stream received from a file or network.

23 Claims, 11 Drawing Sheets

(56) References Cited

U.S. PATENT DOCUMENTS

| | | |
|---|---|---|
| 10,491,240 B1 | 11/2019 | Dupont et al. |
| 2002/0015533 A1 | 2/2002 | Nakamura et al. |
| 2003/0118240 A1 | 6/2003 | Satoh et al. |
| 2003/0202582 A1 | 10/2003 | Satoh |
| 2004/0120404 A1 | 6/2004 | Sugahara et al. |
| 2005/0015248 A1 | 1/2005 | Kadono et al. |
| 2008/0089404 A1 | 4/2008 | Okazaki et al. |
| 2009/0102686 A1* | 4/2009 | Fukuhara ............ H04N 19/436 341/67 |
| 2010/0172583 A1 | 7/2010 | Shimauchi et al. |
| 2010/0223237 A1* | 9/2010 | Mishra ................ G06F 9/30178 707/693 |
| 2011/0109485 A1* | 5/2011 | Kataoka ................ H03M 7/40 341/65 |
| 2012/0099655 A1 | 4/2012 | Niemi et al. |
| 2013/0002458 A1* | 1/2013 | Moriya ................ H03M 7/42 341/67 |
| 2013/0013301 A1 | 1/2013 | Subbaraman et al. |
| 2013/0226594 A1 | 8/2013 | Fuchs et al. |
| 2014/0085115 A1* | 3/2014 | Beier .................. H03M 7/6023 341/106 |
| 2014/0223029 A1 | 8/2014 | Bhaskar et al. |
| 2015/0032705 A1* | 1/2015 | Ideuchi ............... G06F 16/1744 707/693 |
| 2016/0087647 A1* | 3/2016 | Fenney ............... H03M 7/6023 341/67 |
| 2016/0088313 A1* | 3/2016 | Fenney ............... H04N 19/192 382/234 |
| 2018/0041224 A1* | 2/2018 | Setty .................... H03M 7/6011 |
| 2018/0225040 A1 | 8/2018 | Dupont |
| 2019/0110056 A1* | 4/2019 | Fenney ............... H04N 19/423 |
| 2019/0205745 A1 | 7/2019 | Sridharan |
| 2020/0235750 A1 | 7/2020 | Dupont |

OTHER PUBLICATIONS

Office Action for U.S. Appl. No. 16/691,496, dated Feb. 10, 2020, 13 pages.

* cited by examiner

| Character | ASCII |
|---|---|
| A | 0110 0001 |
| B | 0110 0010 |
| C | 0110 0011 |
| D | 0110 0100 |

FIG. 8A

FIG. 8B n = number of bits

| n | Possible outcomes | 2^n |
|---|---|---|
| 0<br>1 | 1 bit = 2 possibilities | (2^1) |
| 00<br>01<br>10<br>11 | 2 bit = 4 possibilities | (2^2) |
| 000<br>001<br>010<br>011<br>100<br>101<br>110<br>111 | 3 bits = 8 possibilities | (2^3) |
| 0000<br>0001<br><br>1111 | 4 bits = 16 possibilities | (2^4) |
| 00000000<br>00000001<br><br>11111111 | 8 bits = 256 possiblities | (2^8) |
| Max 8 bits | (SUM) Total number of posibilities = 510 | |

FIG. 9

| n | Segments allocated | 8 or 16 bit segment selector |
|---|---|---|
| 0 | 01100101 10100000 (most repeated) | 0 |
| 1 | ... | |
| 00 | ... | |
| 01 | ... | |
| 10 | ... | |
| 11 | ... | |
| 000 | ... | |
| ... | ... | |
| 11111111 | 1000100 (least repeated) | 1 |

FIG. 10

SYSTEMS AND METHODS FOR VARIABLE LENGTH CODEWORD BASED DATA ENCODING AND DECODING USING DYNAMIC MEMORY ALLOCATION

CROSS-REFERENCE TO RELATED APPLICATIONS

This application claims priority to and the benefit of U.S. Provisional Patent Application No. 62/630,068, filed Feb. 13, 2018 and titled "Systems and Methods for Variable Length Codeword Based Data Encoding and Decoding Using Dynamic Memory Allocation," which is incorporated herein by reference in its entirety.

FIELD

The present disclosure relates to systems and methods for compressing and decompressing data, for example to increase an effective capacity of storage media or to decrease the bandwidth used for transmitting data over a communications medium.

BACKGROUND

As storage capacity/network bandwidth have increased, so has its demand. One approach to accommodating this increased demand is through data compression.

SUMMARY

Methods, systems and apparatuses for reducing the size of strings of binary data are described. In some embodiments, a method of removing redundancy from a stream of binary data includes parsing a predetermined number of bits from a stream of data (e.g., binary data) and assigning one or more Variable Length Codewords (VLCs) to symbols extracted from the binary data.

In some embodiments, the system can be adaptive in that one or more VLCs are tuned based on the statistics of the symbols in the data stream. For example, short codewords can be substituted for the most frequently occurring symbols, while longer codewords can be substituted for less frequently occurring symbols.

In some embodiments, a system is configured to perform a method for decompressing and reproducing a copy of one or more original uncompressed strings of binary data.

In some embodiments, a system includes a processor and a non-transitory memory in operable communication with the processor. The memory storing instructions executable by the processor to receive binary data including a first data that includes multiple symbols, and to identify multiple repeating segments of the binary data. Each repeating segment from the multiple repeating segments includes a unique subset of symbols from the multiple symbols. The memory also stores instructions executable by the processor to detect frequencies of occurrence of each repeating segment from the multiple repeating segments, and to generate an array representing the frequencies of occurrence. The memory also stores instructions executable by the processor to assign a variable length codeword (VLC) to each repeating segment from the multiple repeating segments, and to store each repeating segment from the multiple segments and the VLC assigned to that repeating segment in a dynamic allocation map. The memory also stores instructions executable by the processor to compress the first data, using the dynamic allocation map, into a second data that includes a compressed version of the first data, and to send a signal representing the second data.

In some embodiments, a method for reducing the size of strings of binary data includes receiving, sequentially, multiple binary data inputs. Each binary data input from the multiple binary data inputs includes an associated first data. For each binary data input from the multiple binary data inputs: multiple repeating segments of the binary data are identified, frequencies of occurrence of each repeating segment from the multiple repeating segments are detected, an array representing the frequencies of occurrence is generated, a code is assigned to each repeating segment from the multiple repeating segments, each repeating segment from the multiple segments and the code assigned to that repeating segment is stored in a compression map, the first data is compressed, using the compression map, into a second data including a compressed version of the first data, and a signal representing the second data is sent.

In some embodiments, a method for reducing the size of strings of binary data includes receiving, at a processor, compressed data having a header. Based on the header, a size of a compressed data segment from the compressed data is detected. Based on the detected size of the compressed data segment, a variable length codeword (VLC) value for the compressed data segment is detected. Decompressed data associated with the VLC value is retrieved from a VLC table, the decompressed data being a decompressed form of the compressed data. A signal representing the decompressed data can then be transmitted/sent.

Example features, structure and operation of various embodiments are described in detail below with reference to the accompanying drawings.

BRIEF DESCRIPTION OF THE DRAWINGS

FIG. 8A is a table showing American Standard Code for Information Interchange (ASCII) representations of characters/symbols, according to some embodiments.

FIG. 8B shows data values and symbol counts, illustrating a compression using the table of FIG. 8A.

FIG. 9 is a table illustrating dynamic memory allocation, according to an embodiment.

FIG. 10 is a table showing the assignment of segment selectors, according to some embodiments.

DETAILED DESCRIPTION

Figure 1:
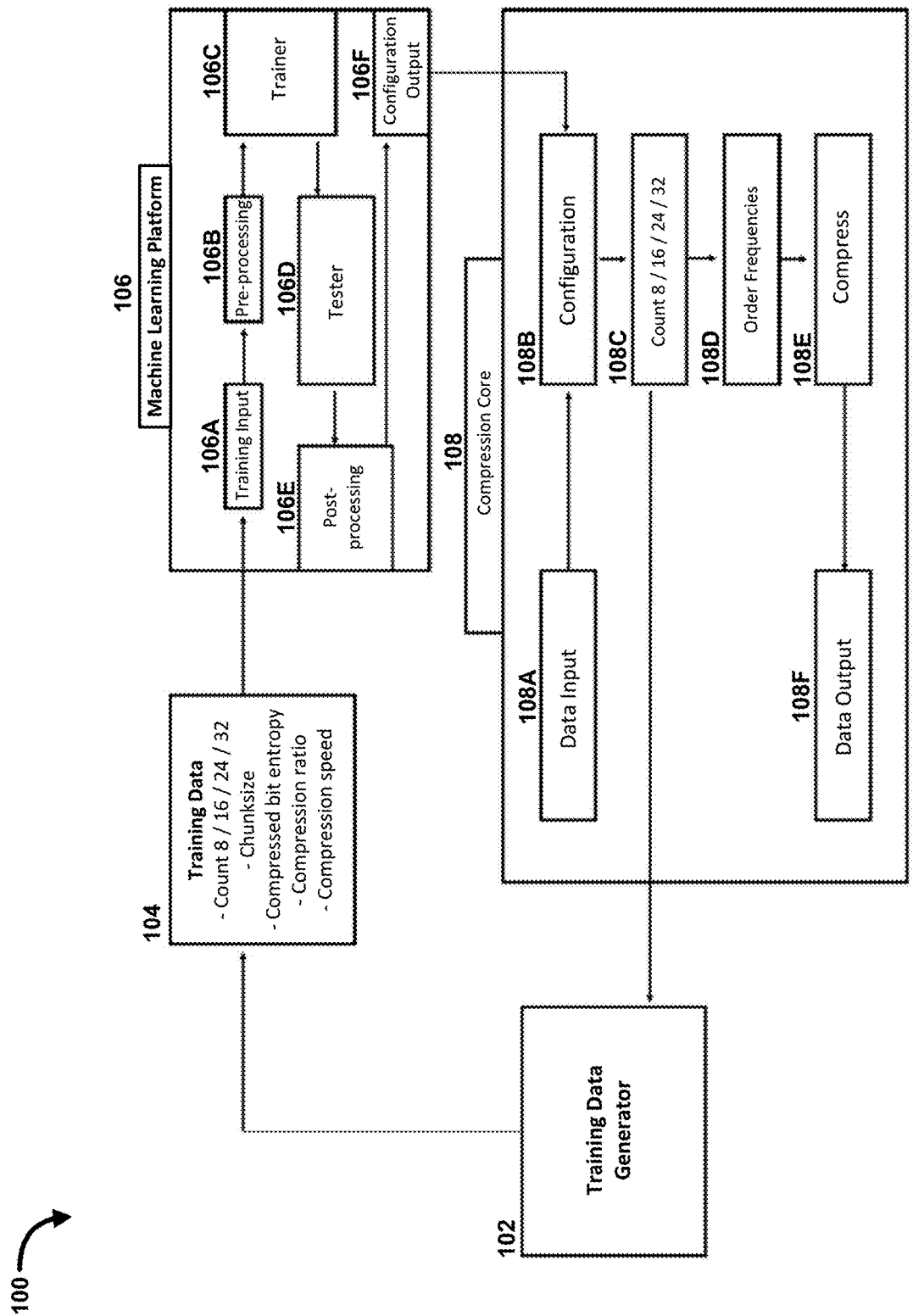
FIG. 1 is a system block diagram for a data compression system, according to some embodiments.

Systems and methods of the present disclosure can achieve levels of data compression that we believe have heretofore never been accomplished, in some instances 90 percent or higher, within substantially the same amount of time in which known data compression methods achieve data compression of 50 percent or less. In some embodiments, a compression method includes receiving a data stream, identifying repeating (also referred to herein as recurring or redundant) segments of the data stream, generating "frequency of occurrence" data for the identified repeating segments, assigning variable length codewords (VLCs) to each of the identified repeating segments, and compressing the data of the received data stream using a dynamic allocation map (also referred to herein as a "VLC map"). In some embodiments, headers are assigned to the compressed data to indicate start/stop locations for the reading of the VLC map during decompression.

Overview of Data Compression

Data compression techniques can be divided into two major categories: lossy and lossless. Lossless data compression techniques are employed when data preservation is desired (i.e., no information is lost in the compression/decompression process). Lossy data compression techniques are typically employed in processing applications such as the transmission and storage of digital video and audio data that can tolerate some information loss. These techniques typically yield greater compression ratios than their lossless counterparts. Over the past 30 years, lossy data compression methods have gained tremendous importance for their use in video conferencing, streaming (e.g., to a large number of devices) and home entertainment systems. Most such applications employ lossy data compression techniques.

For applications using data types such as video, human visual system (HVS) models can be forgiving of potential artifacts due to lossy compression, and compression ratios of 150:1 for Quarter Common Intermediate Format (QCIF) @15 frames per second (fps) over 64 kilobits per second (Kbps) (typically wireless video telephony applications), or 1080P high definition (HD) @60 fps at 20 megabits per second (Mbps) over broadband networks, can be achieved. For the most part, these applications use the modern International Telecommunication Union (ITU) H.264 video compression standard, resulting in high quality video. However, for data types such as documents, spreadsheets, SQL files, etc., it can be important to use lossless data compression. Compression ratios for lossless methods are typically much lower than those for lossy methods. For example, lossless compression ratios can range from 1.5:1 for arbitrary binary data files, to 3.0:1 for files like text documents, where there is much more redundancy.

Transmitting compressed data takes less time than transmitting the same data without first compressing it. In addition, compressed data occupies less storage space than uncompressed data. Thus, for a device with a given storage capacity, more files can be stored on the device when the files are compressed. Advantages of compressing data can include increased storage capacity and decreased transmission time.

Some known data compression techniques employ a branch of mathematics known as information theory. Data compression is linked to the field of information theory because of information theory's concern with redundancy. If the information contained in a message is redundant (i.e., its omission does not reduce the information encoded in the output file), the message can be shortened without losing the information it contains.

"Entropy" is a term used to convey how much information is encoded in a message. A message having high entropy contains more information than a message of equal length having low entropy. The entropy of a symbol in a message is defined as the negative logarithm of its probability of occurrence in the message. The information content of a character, in bits, is expressed as the entropy using base two logarithms as follows:

$$E_{symbol}(X) = -\log_2(\text{probability of symbol}(x))$$

where:

$E_{symbol}(X)$=Entropy of a given symbol in a message
X=message

The entropy H of an entire message X, which is equivalent to the average minimum number of bits needed to represent a symbol, is the sum of the entropy of each symbol occurring in the message:

$$H(X) = -\sum_{i=1}^{n} P_i \cdot \log2(P_i)$$

where $P_i$ is the probability of occurrence of a given symbol.

Given a symbol set {A, B, C, D, E}, where the symbol occurrence frequencies for the symbol set are:

{A=0.5 B=0.2 C=0.1 D=0.1 E=0.1}, the average minimum number of bits needed to represent one of these symbols is:

$$H(X) = -[(0.5 \log_2(0.5) + 0.2 \log_2(0.2) + (0.1 \log_2(0.1) * 3)]$$

$$H(X) = -[-0.5 + (-0.46438) + (-0.9965)]$$

$$H(X) = -[-1.9]$$

$$H(X) = 1.9$$

Rounding H(X) up gives 2 bits/per symbol. Thus, a 10 character string, AAAAABBCDE would use 20 bits to encode optimally. This encoding would allocate fewer bits to the more frequently occurring symbols (e.g., A and B) and longer bit sequences to infrequent symbols (C, D, E), as explained in *A Guide to Data Compression Methods* by Salomon, David (2002), the entire content of which is expressly incorporated by reference herein in its entirety, for all purposes. Note that in the above example, the symbol occurrence frequencies of the symbols in the symbol set happen to match their frequencies of occurrence in the string. However, this may not often be the case in practice. Thus, there are two ways to apply the Shannon entropy equation (the Shannon entropy equation providing a lower bound for the compression that can be achieved):

1) The symbols in a set have known frequencies. These frequencies (for the symbols in the set) may or may not correspond to the frequencies of occurrence of the symbols in a message. As an example, consider that characters in a message each have an average frequency. The number of bits per character can be calculated using the Shannon entropy equation.
2) Symbol frequencies are calculated for a message. The Shannon entropy equation can then be applied to calculate the number of bits per symbol for that message.

A variant on the above technique, known as a "dictionary-based" technique, uses a slightly different approach to data compression. A portion or portions of data to be compressed is first scanned to determine which characters and/or character strings occur most frequently. The identified characters and/or character strings, are placed in a dictionary and assigned predetermined codes having code lengths that are inversely proportional to a probability of occurrence of the characters and/or character strings. The characters and character strings can be read from the data file, matched up with their appropriate dictionary entries, and coded with appropriate codes. A variant on this dictionary-based technique adapts the dictionary based on the changing frequency of occurrence of characters and/or character strings in the data.

There are many lossless data compression methods. Two known data compression methods, Huffman coding and Arithmetic coding, are near-optimal according to Shannon's theorem, with Arithmetic coding usually having a slight edge over Huffman encoding in terms of compression ratio. However, Huffman coding is far more performant in terms of encoding/decoding times than Arithmetic encoding.

Huffman coding is typically based on a frequency of occurrence of a symbol within a given message. The principle is to use a lower number of bits to encode the data that occurs more frequently. The average length of a Huffman-encoded message depends on the statistical frequency with which the source produces each symbol from its syllabary (i.e., partial words). A Huffman code dictionary; which associates each data symbol with a codeword, has the property that no code-word in the dictionary is a prefix of any other codeword in the dictionary. The basis for this coding is a code tree which assigns short code words to frequently occurring symbols, and long code words to symbols that are less frequent or rarely used.

Arithmetic coding bypasses the idea of replacing an input symbol with a specific code. Instead, Arithmetic coding takes a stream of input symbols and replaces it with a single floating-point number in the range of 0 to 1. The number of bits used to encode each symbol varies according to the probability assigned to that symbol. Low probability symbols may use many bits, while high probability symbols use fewer bits. A main idea behind Arithmetic coding is to assign each symbol an interval. Starting with the interval [0 . . . 1), each interval is divided into several sub-intervals having sizes proportional to the probability of the corresponding symbols. The subinterval from the coded symbol is then taken as the interval for the next symbol. The output is the interval of the last symbol. It is important to note that Arithmetic coding is model-based, in that it relies on a model to characterize the symbols it is processing. The job of the model is to provide information to the encoder about the probability that a given symbol is in message. If the model gives an accurate probability of the symbols in the message, the symbols will be encoded very close to optimally. However, if the model misrepresents the probabilities of symbols, the encoder may actually expand a message instead of compressing it.

Another popular method, known as the Lempel-Ziv-Welch (LZW) algorithm, was originally developed by Ziv and Lempel, and subsequently improved by Welch. Popular text compressors such as "Zip" and Unix's file compression utility "Compress" are based on LZW. It is also used in the popular GIF image format. Although the compression ratios achieved with LZW are lower than those for other compression algorithms like Huffman and Arithmetic encoding, it is still popular. LZW compression uses a code table, with 4096 as a common choice for the size. Codes 0-255 in the code table are assigned to represent single bytes from the input message. When encoding begins, the code table contains only the first 256 entries, with the remainder of the table being blanks. Compression is achieved by using codes 256 through 4095 to represent sequences of bytes. As the encoding continues, LZW identifies repeated sequences in the message, and adds them to the code table. Decoding is achieved by taking each code from the compressed file and translating it through the code table to find which character or characters it represents.

There are a number of other loss less data compression methods, including methods that are based on LZW. Additional details regarding lossless data compression methods can be found in History of Lossless Data Compression Algorithms, Aug. 20, 2014, accessed at http://ethw.org/History_of_Lossless_Data_Compression_Algorithms, which is incorporated herein by reference in its entirety.

Novel Methods for Lossless Data Compression

Systems and methods of the present disclosure can achieve levels of data compression that we believe have heretofore never been accomplished. Known data compression products generally cannot obtain compression greater than 50 percent for text and graphic files, and are even less successful (approximately 45 percent compression) on program execution files. In some implementations of the present disclosure, data compression levels of 90 percent (and greater in certain applications) can be achieved in no more time than it presently takes available data compression products to compress the same data to 50 percent levels. High compression percentages can be achieved by locating and separating ordered streams of information from what appears to be random (or chaotic) forms of information. Prior methods of data compression have largely been unsuccessful in finding order (redundancy) within data which otherwise appears to be randomly arranged (without redundancy). Consequently, they are ineffective for compressing such data.

Overview of Compression and Decompression

FIG. 1 is a system block diagram for a data compression system 100, according to some embodiments. As shown in FIG. 1, a training data generator 102 (e.g., a software program that reads outputs produced by a compressor) sends training data 104, which can include an indicator representing a count (e.g., 8, 16, 24 or 32 bits), a chunk size, a compressed hit entropy, a compression ratio and/or a compression speed. The training data 104 can be sent to a machine learning platform 106 (e.g., a software program/platform for refining/improving configuration data 108B prior to compression). To accomplish this, the machine learning platform 106 receives the training input data 106A and applies a pre-processing 106B method on at least a portion of the training input data 106A. The output of this process is sent to a trainer 106C of the machine learning platform 106, and then to a tester 106D. Data output from the tester 106D can undergo post-processing 106E, after which it is used to generate a configuration output 106F that is sent from the machine learning platform 106 to a compression core 108 (which can serve as the main compression algorithm, discussed further below). Both the configuration data 108B and a data input 108A are received in the compression core 108, and are used as part of a compression process. At 108C, a count of the data size (8, 16, 24 or 32-bit) is performed. Symbols (or "segments") of the data are ordered according to their frequency of occurrence at 108D, and compressed (e.g., based on the configuration data received at 108B) at 108E before being output as compressed data at 108F. The count information obtained at 108C can also be sent to the training data generator 102, to act as additional data for training the machine learning platform.

Figure 2:
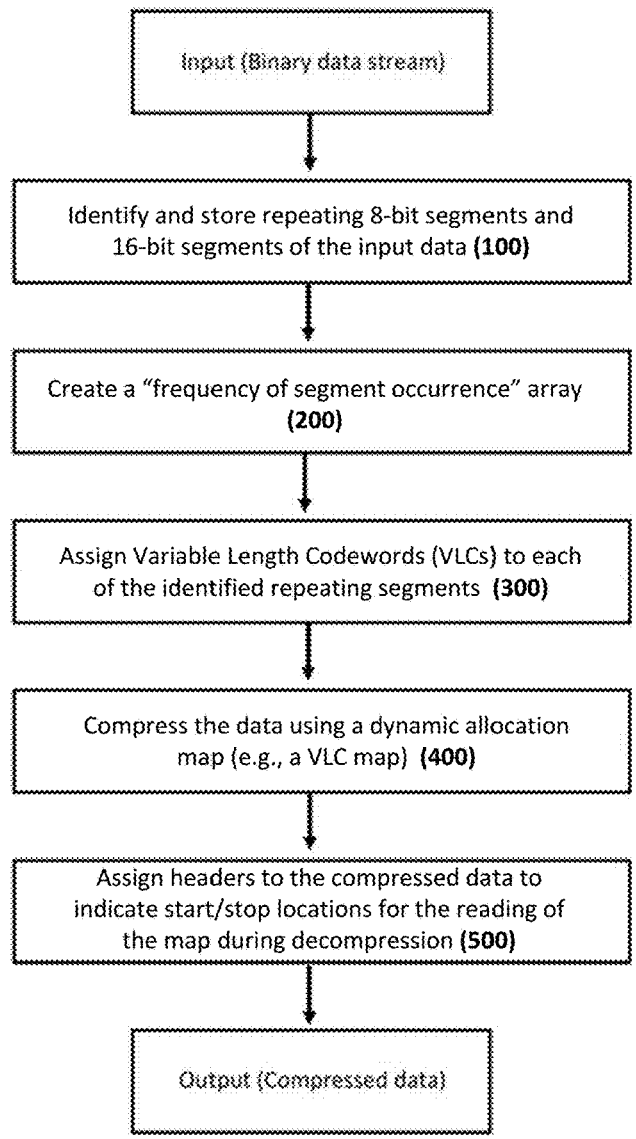
FIG. 2 is a data flow diagram showing a compression process, according to some embodiments.

FIG. 2 is a data flow diagram showing a compression process 150, which may be performed by the system 100 of FIG. 1, according to some embodiments. As shown in FIG. 2, a binary data stream is received, and 8-bit and/or 16-bit segments are identified and stored (100). A frequency-of-occurrence array is generated at 200, to capture a frequency of occurrence for each segment appearing in the input data stream. At 300, variable length codewords (VLCs) are assigned to the segments, and the data is subsequently compressed, at 400, using a dynamic allocation map. Headers are assigned to the VLCs at 500, to identify start and stop location for reading the dynamic allocation map, and the compressed data is output.

Figure 3:
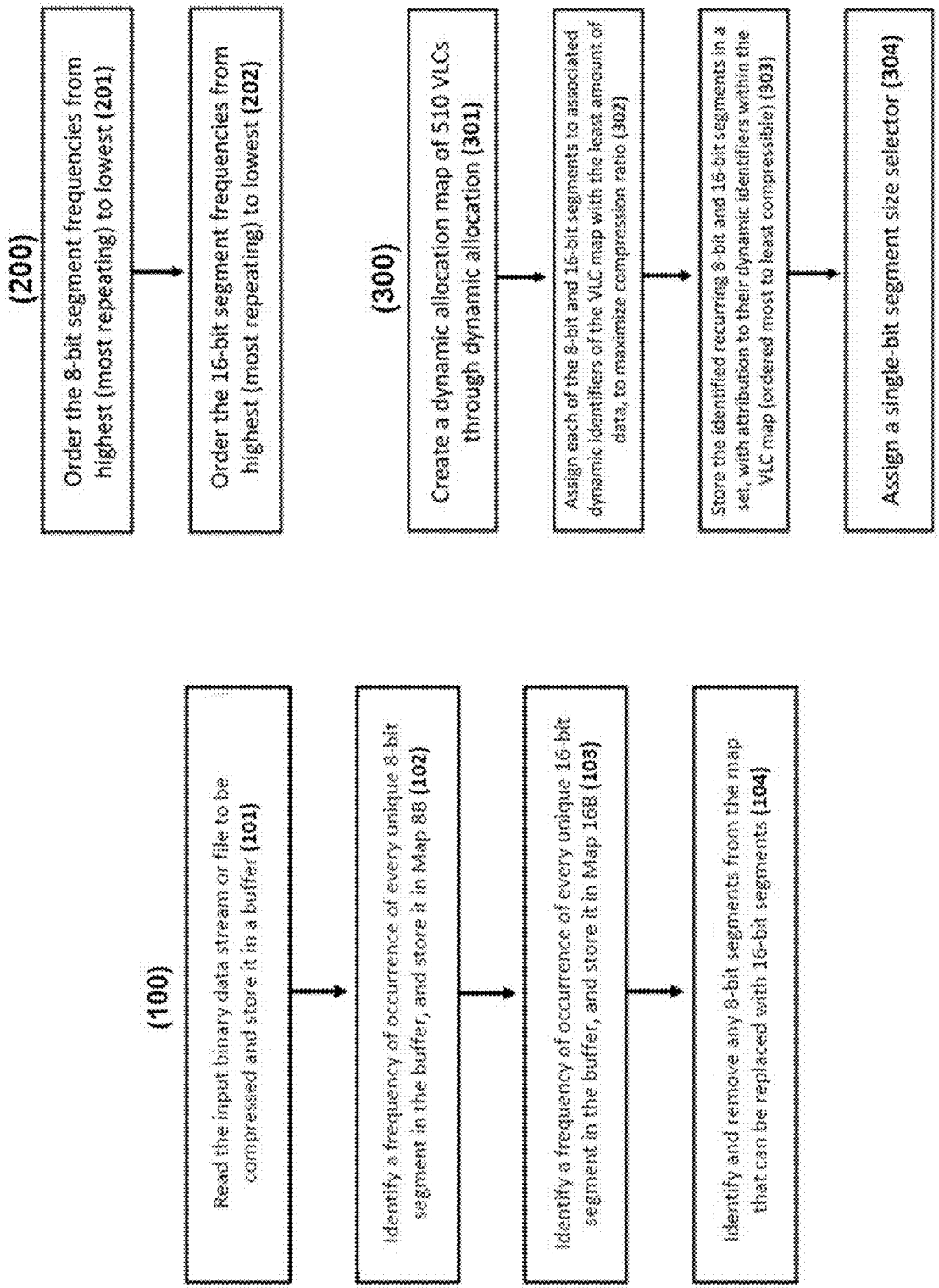
FIG. 3 includes data flow diagrams showing additional detail for portions of the compression process of FIG. 2.

FIG. 3 includes data flow diagrams showing additional detail for portions of the compression process of FIG. 2. As shown in FIG. 3, additional steps are shown for step (100) of FIG. 2, where 8-bit and/or 16-bit segments are identified and stored. At 101, the binary stream or file to be compressed is read and stored into a buffer. At 102, the frequency of occurrence of every unique 8-bit segment present in the buffer is determined and stored in an 8-bit dynamic allocation map (Map 8B). At 103, the frequency of occurrence of every unique 16-bit (16B) segment present in the buffer is determined and stored in a 16-bit dynamic allocation map (Map 16B). At 104, repeating 8-bit segments from Map 8B that can be replaced by segments from Map 16B are detected and removed.

FIG. 3 also shows additional steps for the compression steps (200) and (300) of FIG. 2, corresponding to the creation of a "frequency of segment occurrence" array and the assignment of VLCs to each of the identified repeating segments, respectively. At 201, 8-bit segments are ordered from the most frequently repeating to the least frequently repeating. At 202, the 16-bit segments are ordered from the most frequently repeating to the least frequently repeating. At 301, a map of 510 VLCs is created using dynamic allocation. At 302, 8-bit and 16-bit segments are assigned to VLCs, representable by the least amount of data to yield the highest possible compression ratio. At 303, the set is stored as attributed to their dynamic identifiers within the VLC map, ordered most compressible segment to least compressible segment.

Figure 4:
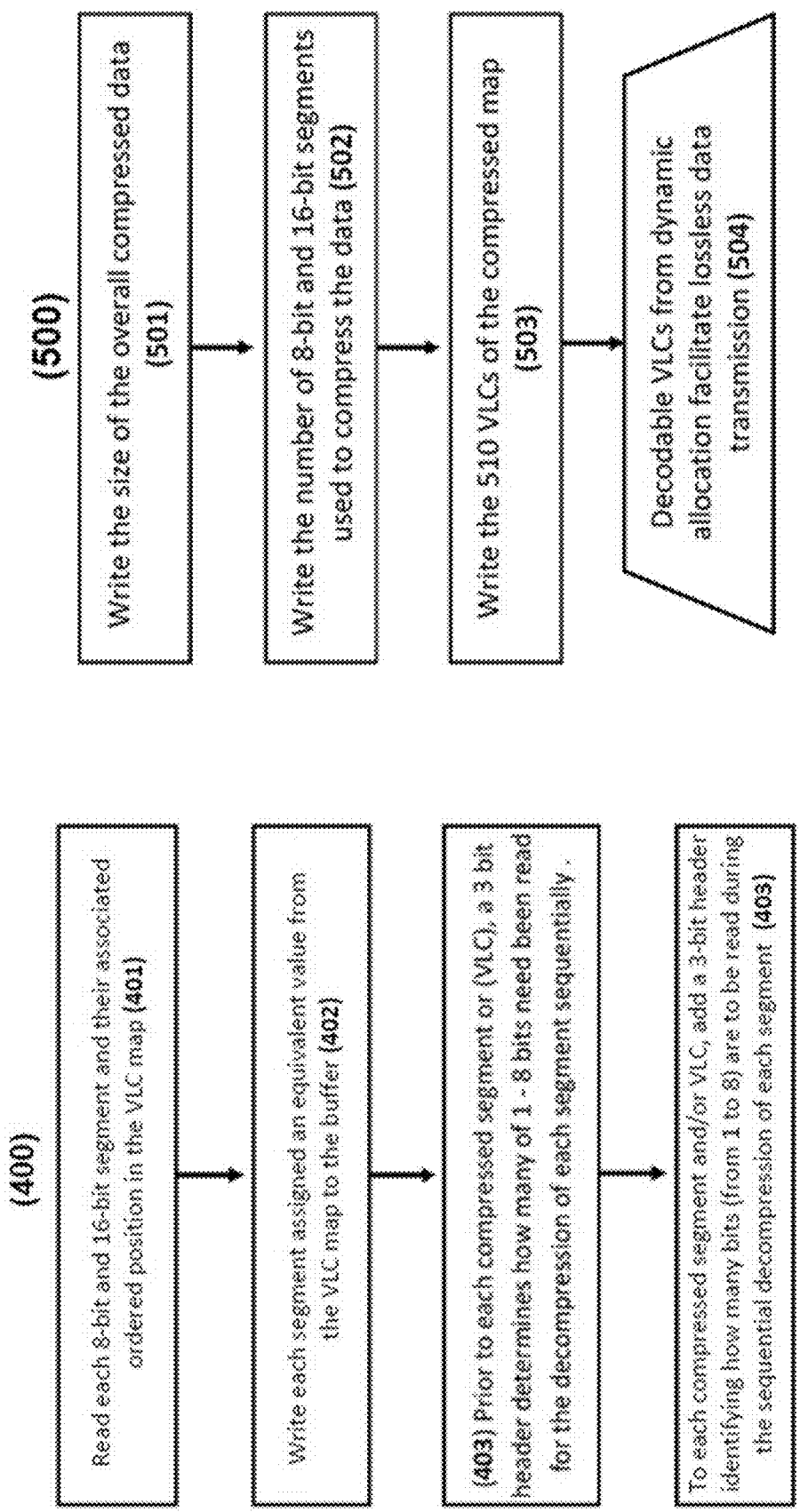
FIG. 4 includes data flow diagrams showing additional detail for portions of the compression process of FIG. 2.

FIG. 4 is a data flow diagram showing additional detail for portions of the compression process of FIG. 2. As shown in FIG. 4, additional steps are shown for steps (400) and (500) of FIG. 2, corresponding to the compression of data using a dynamic allocation map, and the assignment of headers to the compressed data, respectively. At 401, every 8-bit and 16-bit segment is read, and their positions in the compressed (VLC) map are determined. At 402, segments assigned equivalent values in the VLC map are identified and written into the output buffer. At 403, a 3-bit header is inserted prior to each compressed segment VLC, to identify how many bits (i.e., from 1 to 8 bits) are to be read for the sequential decompression of each segment. At 404, a number of loops to compress the entire buffer is counted.

At 501, a size of the overall compressed data is written to memory. At 502, a number of 8-bits and 16-bits used to compress the data is written to the memory. At 503, the 510 VLC's of the compressed map are written to memory. As a result, at 504, decodable/decompressible VLCs are obtained, allowing for lossless or substantially lossless data transmission.

Figure 5:
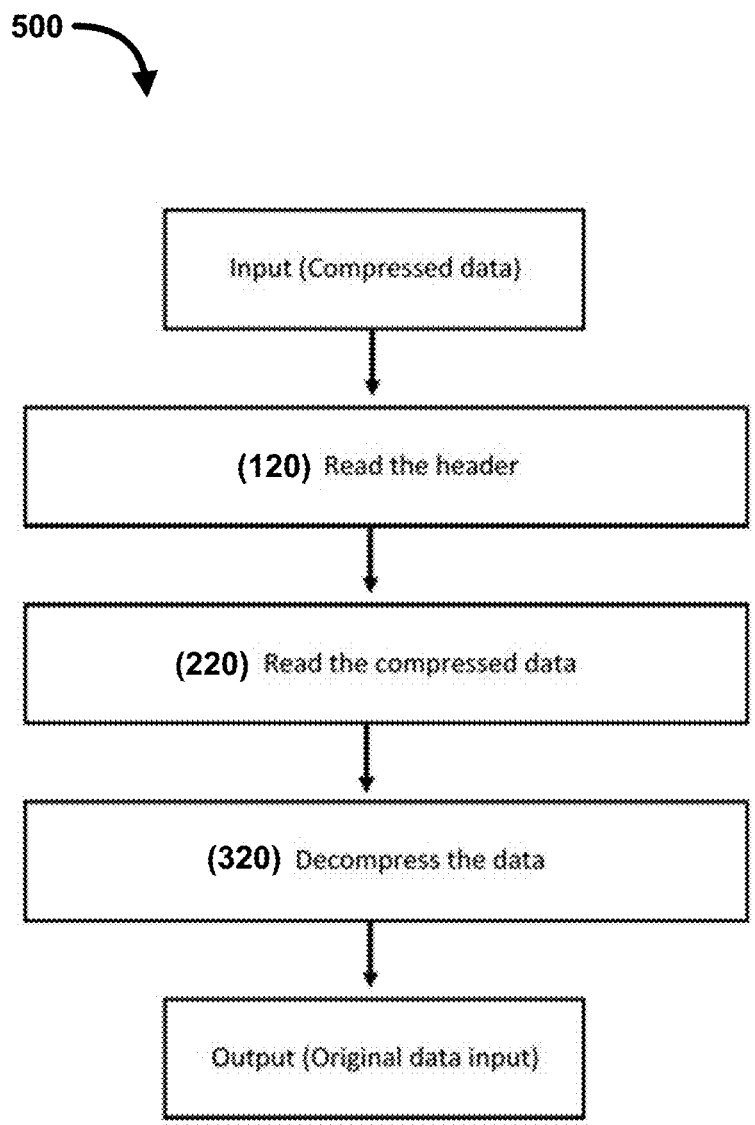
FIG. 5 is a data flow diagram showing a decompression process, according to some embodiments.

FIG. 5 is a data flow diagram showing a decompression process 500, according to some embodiments. As shown in FIG. 5, compressed data is received, and a header of the received compressed data is read (120), followed by the compressed data itself (220). The compressed data is decompressed at 320, resulting in the original (pre-compression) data being output.

Figure 6:
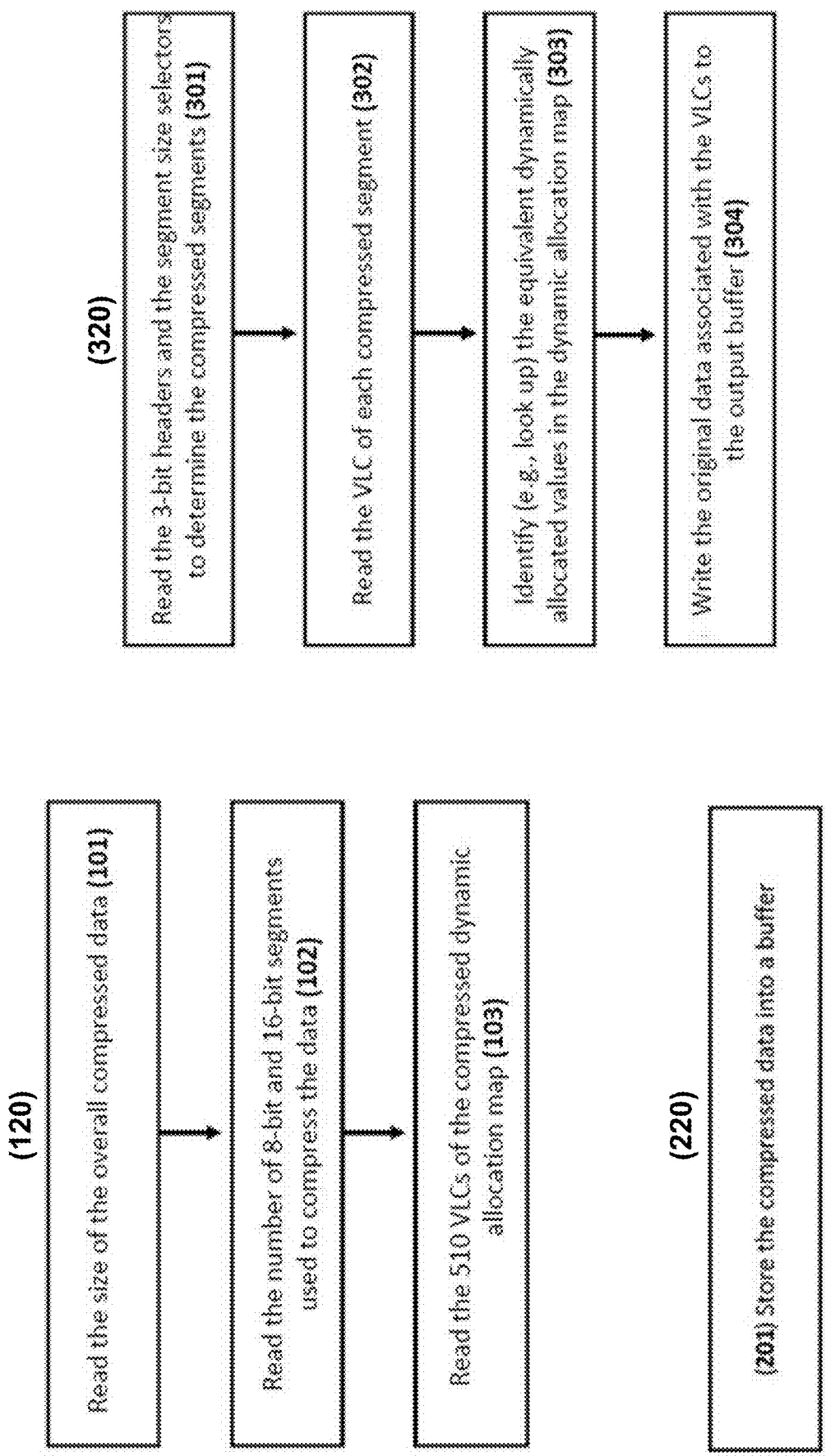
FIG. 6 includes data flow diagrams showing additional detail for portions of the decompression process of FIG. 5.

FIG. 6 includes data flow diagrams showing additional detail for portions of the compression process of FIG. 5. As shown in FIG. 6, additional steps are shown for each of steps (120), (220) and (320) of FIG. 5. At 101, a size of the overall compressed data is read. At 102, the number of 8-bits and 16-bits used to compress the data is read. At 103, the 510 VLC's of the compressed map are read. Step (220) includes storing the compressed data into a buffer (201).

At 301, the 3-bit header and segment size selector are read to determine the compressed segment. At 302, the compressed segments' VLCs are read. At 303, the equivalent dynamically allocated values in the VLC map are identified. At 304, the original data attributed to their identifiers is written into the output buffer.

Dynamic Memory Allocation

Figure 7:
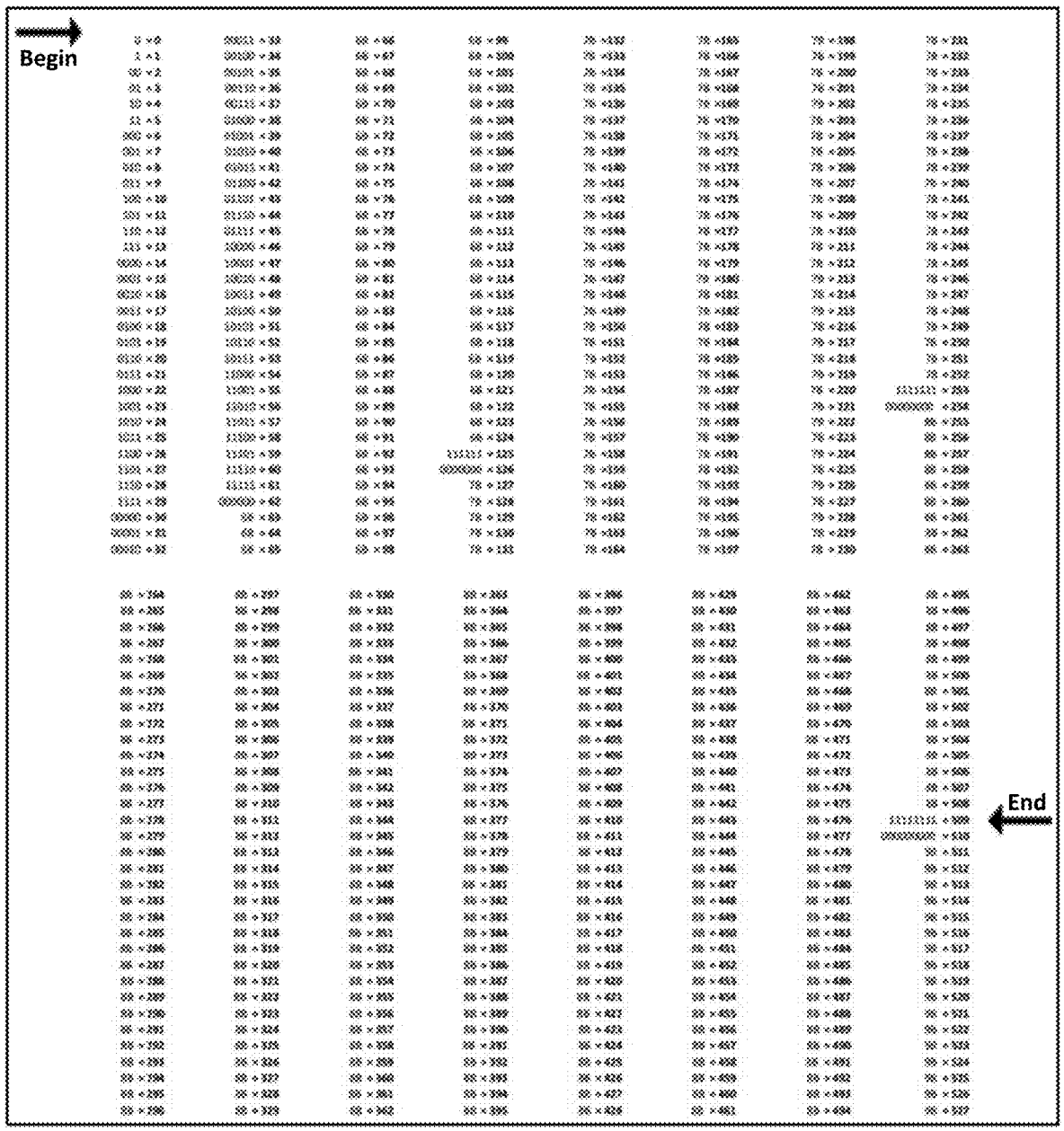
FIG. 7 is a data set illustrating dynamic memory allocation, according to an embodiment.

Using the concept of dynamic memory allocation, systems and methods of the present disclosure can use 8 bits to represent a total of 510 possibilities, stored in an addressable dynamic allocation table (or "map"), as shown by FIG. 7. The data set of FIG. 7 can be used to define the Variable Length Codewords (VLCs) or dynamic identifiers used in compression (e.g., 400 in FIG. 2) and in decompression (e.g., 320 in FIG. 5).

As an example, for compression of a 25 kB file input, a first stage can be to identify how many times 8-bit segments are repeated (see, e.g., step 102 in FIG. 3). A second step can be to identify how many repetitions of 16 bit-segments occur in the file (see, e.g., step 103 in FIG. 3). In some embodiments, the segment size is a variable that depends on the data input, which may have a size of 8, 16, 24 or 32 bits long. The segment size can also determine the entropy through dynamic allocation. For example:

0000 0000 appears in the file 125 times 00000000 00000000 appears in the file 57 times 0000 0001 appears in the file 204 times 00000000 00000001 appears in the file 37 times

: :

: :

: :

1111 1111 appears in the file 75 times 11111111 11111111 appears in the file 15 times Since more compression can be obtained from the repetition of larger bit segments, a next step in this example is to look at the repeating 16-bit segments, and to remove the repeating 8-bit segments, so as not to compress them twice (see, e.g., step 104 in FIG. 3). For example:

If 11000000 10000001 appears in the file 3 times, then three instances of 1100 0000 can be removed, and three instances of 1000 0001 can be removed.

In some implementations, if a 16-bit segment only occurs once in the file, then there is at least one 8-bit sequence that also only occurs once. The algorithm, while capable of compressing 8-bits if necessary, will tend towards larger segments where possible, so as to gain more compression. FIGS. 8A and 8B illustrate another example of this process (see, e.g., step 104 in FIG. 3). FIG. 8A shows ASCII (binary or digital) definitions of four different characters, A, B, C and D. FIG. 8B shows a data stream ("(a)") that includes two instances of symbol A and two instances of symbol B. Since sequence "AB," corresponding to the 16-bit sequence 0110000101100010, occurs twice, one each of symbols A and B can be removed during compression, resulting in the compression version of the data shown at ("(b)").

A second stage in the compression algorithm is to arrange the repeating segments (16 bits or 8 bits in this case) in descending order, from the most frequently repeated to the least frequently repeated (see, e.g., steps 201 and 202 in FIG.

3). When arranging the repeating segments, a map can be used of the 510 possibilities (VLC'S) representable by dynamic allocation of from 1-8 bits, as displayed by FIGS. 7 and 9 (see, e.g., step 301 in FIG. 4). Note that the dynamic allocated entropy can be a variable that is subject to change upon on the data input. In this example, 1-8 bits are used to produce an entropy of 510 ($2^8+2^7+ \ldots +2^2+2^1=510$), however 1-9 bits could similarly be used, for example to produce 1014 VLC's. For binary data, the number of possible bit sequences (or "outcomes" in FIG. 9) is defined by $2^n$, where "n" is the number of bits.

Next, for the 8-bit or 16-bit repeating segments identified, the most frequently repeating segment is allocated the lowest possible (VLC) representation ([0] or [1] bit), and the least frequently repeating segment is allocated the greatest possible outcome ([11111111] or 1 byte) (see, e.g., steps 302 and 303 in FIG. 4). For example:

Position n=0 of the map can be used to refer to 0110010110100000 (2 bytes), which appears in the file 157 times (most repeated)

Going from 16*157 (2512 bits) to 1*157 (157 bits) means that 93.75% less information is used.

Position n=11111111 of the map can be used to refer to 01000100 (1 byte), which appears in the file 4 times (least repeated)

In addition to allocating a VLC to each possible segment, a determination is made regarding whether the original segment size was 8 bits or 16 bits long. This information is carried by a single bit (i.e., a 1 or a 0), coined a "segment selector" bit, as shown by FIG. 10 (see, e.g., step 304 in FIG. 4), in which "0" signifies a 16-bit segment, and "1" signifies an 8-bit segment.

The allocations can be carried out sequentially, from the most frequently occurring segment to the least frequently occurring segment, and can use up to the total of 510 possibilities to do so, ordering them in such a way that, using dynamic allocation, a significantly reduced amount of information is used to represent a far larger amount of data. Compressing the data in this format facilitates complete lossless recovery of the original data with high compression ratios.

Each of the segments is assigned a unique VLC out of the 510 possibilities based on their frequency of occurrence, resulting in a significantly compressed file. A final stage of the algorithm involves ensuring that the compressed data can be read during a decompression process. This can involve the use of a header prior to each unique VLC value, represented by "n" in FIGS. 9-10 and representative of a repeating 8-bit or 16-bit segment (see, e.g., step 400 in FIG. 2).

In some embodiments, a size of each segment being compressed, as well as and where to start reading/decompressing from, are distinguishable through dynamic allocation.

In some embodiments, a size of each segment being compressed is from 1 to 8 bits, since all repeating segments were replaced through dynamic allocation of a variable length code having a maximum length of 8. This means that only 3 bits are needed for each header to represent a size (i.e., from 1-8 bits long) of the VLC being read. For example:

[000]=1 bit, [001]=2 bits, [010]=3 bits→[111]=8 bits.

As such, before every compressed segment, a 3-bit header is placed to indicate that the following X number of bits (1-8 max) are to be decompressed (see, e.g., step 403 in FIG. 3).

Figure 11:
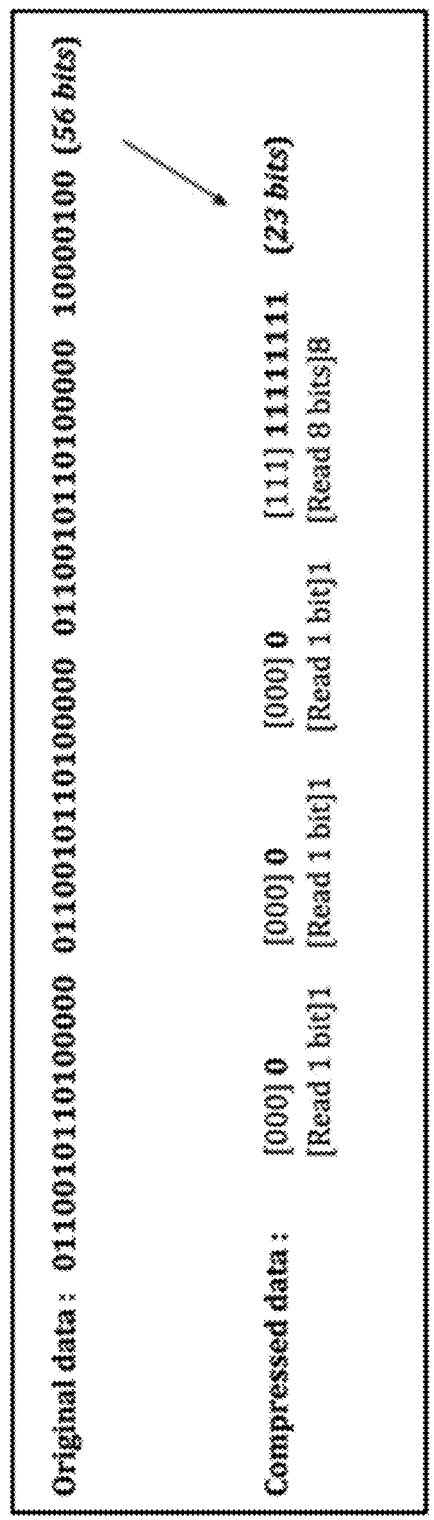
FIG. 11 shows a comparison between an original data sequence and a compressed version thereof, according to some embodiments.

FIG. 11 provides a visual representation of the original input and compressed data and the format in which it is read via the 3 bit headers.

All combinations of the foregoing concepts and additional concepts discussed herein (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A system, comprising:
a processor; and
a non-transitory memory in operable communication with the processor, the memory storing instructions executable by the processor to:
receive binary data including a first data that includes a plurality of symbols,
identify a plurality of repeating binary data segments of the binary data, each repeating binary data segment from the plurality of repeating binary data segments including a unique subset of symbols from the plurality of symbols,
detect frequencies of occurrence of each repeating binary data segment from the plurality of repeating binary data segments,
generate an array representing the frequencies of occurrence,
assign a variable length codeword (VLC) from a plurality of VLCs to each repeating binary data segment from the plurality of repeating binary data segments,
generate a dynamically-allocated memory map based on the array by storing each repeating binary data segment from the plurality of repeating binary data segments and the VLC assigned to that repeating binary data segment in the dynamically-allocated memory map, with the repeating binary data segments from the plurality of repeating binary data segments ordered within the dynamically-allocated memory map from most frequently repeating to least frequently repeating, and the plurality of VLCs ordered from smallest to largest,
compress the first data, using the dynamically-allocated memory map, into a second data that includes a compressed version of the first data, and
send a signal representing the second data.

2. The system of claim 1, wherein the memory further stores instructions executable by the processor to assign headers to the second data prior to sending the signal representing the second data, the headers indicative of start and stop read locations for reading the dynamically-allocated memory map during decompression of the second data.

3. The system of claim 1, wherein the instructions executable by the processor to detect the frequencies of occurrence for each repeating binary data segment from the plurality of repeating binary data segments includes instructions executable by the processor to:
identify frequencies of occurrence of unique 8-bit segments and unique 16-bit segments of the first data; and
store the frequencies of occurrence of unique 8-bit segments and unique 16-bit segments of the first data in the memory.

4. The system of claim 3, wherein the memory further stores instructions executable by the processor to:
detect and remove a subset of the unique 8-bit segments that can be replaced with a subset of the unique 16-bit segments.

5. The system of claim 1, wherein the instructions executable by the processor to generate the array include instructions executable by the processor to:
order 8-bit segments from the plurality of repeating binary data segments based on the frequencies of occurrence associated with the 8-bit segments; and
order 16-bit segments from the plurality of repeating binary data segments based on the frequencies of occurrence associated with the 16-bit segments.

6. The system of claim 1, wherein the instructions executable by the processor to assign the VLC to each repeating binary data segment from the plurality of repeating binary data segments include instructions executable by the processor to associate 8-bit segments from the plurality of repeating binary data segments and 16-bit segments from the plurality of repeating binary data segments to identifiers of the dynamically-allocated memory map.

7. The system of claim 1, wherein the instructions executable by the processor to assign the VLC to each repeating binary data segment from the plurality of repeating binary data segments include instructions executable by the processor to order the repeating binary data segments from the plurality of repeating binary data segments from most compressible to least compressible.

8. A method, comprising:
receiving, sequentially, a plurality of binary data inputs, each binary data input from the plurality of binary data inputs including an associated first data, and
for each binary data input from the plurality of binary data inputs:
identifying a plurality of repeating binary data segments of the binary data,
detecting frequencies of occurrence of each repeating binary data segment from the plurality of repeating binary data segments,
generating an array representing the frequencies of occurrence,
assigning a code to each repeating binary data segment from the plurality of repeating binary data segments,
generating a dynamically-allocated memory map based on the array by storing each repeating binary data segment from the plurality of repeating binary data segments and the code assigned to that repeating binary data segment in the dynamically-allocated memory map, with the repeating binary data segments from the plurality of repeating binary data segments ordered within the dynamically-allocated memory map from most frequently repeating to least frequently repeating, and the codes ordered from smallest to largest,
compressing the first data, using the dynamically-allocated memory map, into a second data including a compressed version of the first data, and
sending a signal representing the second data.

9. The method of claim 8, further comprising, for each binary data input from the plurality of binary data inputs:
assigning headers to the second data prior to sending the signal representing the second data, the headers indicative of start and stop read locations for reading the dynamically-allocated memory map during decompression of the second data.

10. The method of claim 8, wherein the detecting the frequencies of occurrence for each repeating binary data segment from the plurality of repeating binary data segments includes:
identifying frequencies of occurrence of unique 8-bit segments and unique 16-bit segments of the first data; and
storing the frequencies of occurrence of unique 8-bit segments and unique 16-bit segments of the first data in the memory.

11. The method of claim 10, further comprising, for each binary data input from the plurality of binary data inputs:
detecting and removing a subset of the unique 8-bit segments that can be replaced with a subset of the unique 16-bit segments.

12. The method of claim 8, wherein the generating the array includes:
ordering 8-bit segments from the plurality of repeating binary data segments based on the frequencies of occurrence associated with the 8-bit segments; and
ordering 16-bit segments from the plurality of repeating binary data segments based on the frequencies of occurrence associated with the 16-bit segments.

13. The method of claim 8, wherein the assigning the codes to each repeating binary data segment from the plurality of repeating binary data segments includes associating 8-bit segments from the plurality of repeating binary data segments and 16-bit segments from the plurality of repeating binary data segments to dynamic identifiers of the dynamically-allocated memory map.

14. The method of claim 8, wherein the assigning the codes to each repeating binary data segment from the plurality of repeating binary data segments includes ordering the repeating binary data segments from the plurality of repeating binary data segments from most compressible to least compressible.

15. The method of claim 9, wherein the headers are 3-bit headers, and each of the codes has a length of between 1 bit and 8 bits.

16. A method, comprising:
   receiving, at a processor, compressed data having a header;
   detecting, based on the header, a size of a compressed data segment from the compressed data;
   detecting, based on the size of the compressed data segment, a variable length codeword (VLC) value for the compressed data segment;
   retrieving decompressed data associated with the VLC value from a VLC table that includes a plurality of binary data segments ordered within a dynamically-allocated memory map from most frequently repeating to least frequently repeating, and the VLC values ordered from smallest to largest, the decompressed data being a decompressed form of the compressed data; and
   sending a signal representing the decompressed data.

17. The method of claim 16, wherein the header is a 3-bit header, and the VLC value has a length of between 1 bit and 8 bits.

18. The method of claim 16, wherein detecting the size of the compressed data segment is based on a compressed segment length of the header.

19. The method of claim 16, further comprising detecting, based on the header, a bit count of the decompressed data associated with the compressed data segment, the retrieving decompressed data based on the bit count of the decompressed data.

20. The method of claim 16, wherein the VLC table is configured to store up to 510 VLC values.

21. The system of claim 1, wherein the second data includes a plurality of compressed segments, and the instructions executable by the processor to compress the first data into the second data include instructions to include, in the second data, headers identifying numbers of bits to be read during sequential decompression of each compressed segment from the plurality of compressed segments.

22. The system of claim 1, wherein the memory further stores instructions executable by the processor to receive configuration data, and the instructions executable by the processor to compress the first data into the second data include instructions to compress the first data based on the configuration data.

23. The system of claim 1, wherein the memory further stores instructions executable by the processor to count a number of loops to compress an entire buffer.

* * * * *

UNITED STATES PATENT AND TRADEMARK OFFICE
CERTIFICATE OF CORRECTION

| | | |
|---|---|---|
| PATENT NO. | : 11,044,495 B1 | Page 1 of 1 |
| APPLICATION NO. | : 16/274417 | |
| DATED | : June 22, 2021 | |
| INVENTOR(S) | : Nicolas Thomas Mathieu Dupont et al. | |

It is certified that error appears in the above-identified patent and that said Letters Patent is hereby corrected as shown below:

In the Specification

Column 6, Line 4, "loss less" should read --lossless--

Column 6, Line 38, "hit" should read --bit--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*